US010268759B1

United States Patent
Witt et al.

(10) Patent No.: US 10,268,759 B1
(45) Date of Patent: Apr. 23, 2019

(54) AUDIO STREAM PRODUCTION USING SEQUENCES OF SELECT CONTENT

(71) Applicant: Empowering Trainers, LLC, Greenwich, CT (US)

(72) Inventors: Evan Witt, Boston, MA (US); Michael Bressler, Greenwich, CT (US)

(73) Assignee: Empowering Trainers, LLC, Greenwich, CT (US)

( * ) Notice: Subject to any disclaimer, the term of this patent is extended or adjusted under 35 U.S.C. 154(b) by 0 days.

(21) Appl. No.: 15/924,930

(22) Filed: Mar. 19, 2018

(51) Int. Cl.
*A63B 71/06* (2006.01)
*G06F 17/00* (2006.01)
*G06F 17/30* (2006.01)
*H04N 21/439* (2011.01)
*H04N 21/233* (2011.01)

(52) U.S. Cl.
CPC ..... *G06F 17/30752* (2013.01); *H04N 21/233* (2013.01); *H04N 21/4394* (2013.01); *A63B 71/0622* (2013.01)

(58) Field of Classification Search
CPC .... A63B 2071/0625; A63B 2024/0012; A63B 2225/20; A63B 24/0003; A63B 71/0622
See application file for complete search history.

(56) References Cited

U.S. PATENT DOCUMENTS

| | | | |
|---|---|---|---|
| 7,668,885 B2 | 2/2010 | Wittke et al. | |
| 8,156,176 B2 | 4/2012 | Lerman et al. | |
| 8,230,343 B2 | 7/2012 | Logan et al. | |
| 8,529,409 B1 | 9/2013 | Lesea-Ames | |
| 8,968,156 B2 | 3/2015 | Ellis et al. | |
| 9,079,059 B2 | 7/2015 | Cardoso, Jr. et al. | |
| 9,345,948 B2 | 5/2016 | Martin | |
| 9,613,659 B2 | 4/2017 | Maser et al. | |
| 9,691,428 B2 | 6/2017 | Maser et al. | |
| 9,720,997 B2 | 8/2017 | Li et al. | |
| 2006/0184538 A1 | 8/2006 | Randall et al. | |
| 2013/0196821 A1 | 8/2013 | Watterson et al. | |
| 2014/0065587 A1 | 3/2014 | Liebhart | |
| 2014/0272855 A1 | 9/2014 | Maser et al. | |
| 2015/0118657 A1 | 4/2015 | Shrake et al. | |
| 2016/0375306 A1 | 12/2016 | Gu et al. | |
| 2017/0017658 A1* | 1/2017 | Blong | G06F 17/30058 |
| 2017/0161376 A1 | 6/2017 | Maser et al. | |
| 2017/0259120 A1* | 9/2017 | King | A63B 24/0075 |
| 2017/0259121 A1 | 9/2017 | King et al. | |

\* cited by examiner

*Primary Examiner* — Thomas H Maung
(74) *Attorney, Agent, or Firm* — Young Basile Hanlon & MacFarlane, P.C.

(57) ABSTRACT

Audio streams can be produced according to sequences of select content items. A first content item can be identified based on user input indicating tags associated with it. A second content item, and a content sequence for ordering the first content item and second item, are identified based on scores determined for various candidate content items. An audio stream is produced according to the content sequence and may then be transmitted to a client device for playback. The tags include metadata usable to selectively identify content items that can be combined to produce an optimal audio stream, such as based on the types of content items, the number of content items, the purpose of the content items to the audio stream, or more. Missing content items can be detected and signaled for production. An audio stream and content sequence therefor can be updated after initial production occurs.

20 Claims, 8 Drawing Sheets

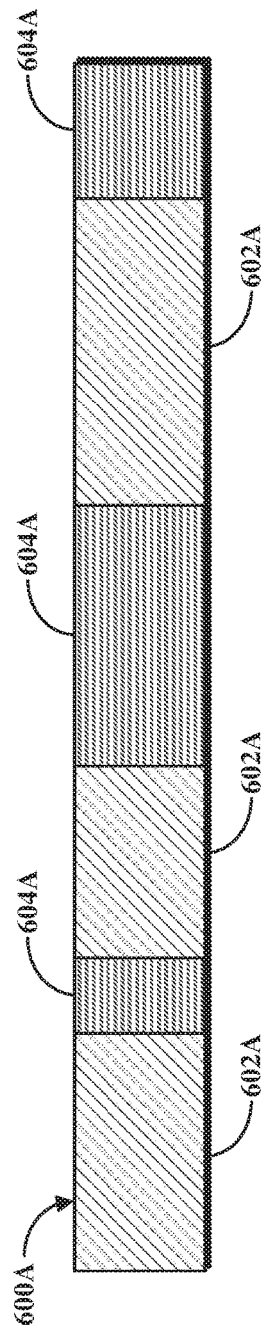
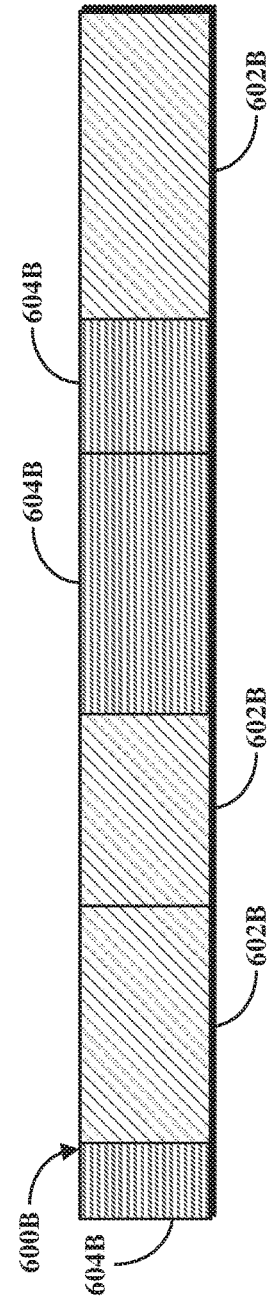
FIG. 6A
FIG. 6B

AUDIO STREAM PRODUCTION USING SEQUENCES OF SELECT CONTENT

TECHNICAL FIELD

This disclosure relates to audio stream production using sequences of select content.

BACKGROUND

An audio stream includes content items that, when played, cause a specific sound or noise to be output. For example, an audio stream produced for playback during a workout may include content indicating which exercises are to be performed during that workout, instructions for performing those exercises, or the like. Producing such an audio stream typically includes manually producing the content each time or otherwise sorting through lengthy lists of previously produced content to determine what to include in the audio stream.

SUMMARY

A method for producing and transmitting an audio stream according to one implementation of this disclosure includes receiving, from a first client device, input defining a first content item to include in the audio stream. The input indicates one or more tags associated with one or more content types of the first content item. The method further includes determining, based on the one or more tags, that the first content item is associated with a second content item. The method further includes, responsive to determining that the first content item is associated with the second content item, retrieving the second content item from a database. The method further includes determining, based on the one or more tags and at least one tag associated with one or more content types of the second content, a content sequence for the first content item and the second content item. The method further includes producing the audio stream according to the content sequence. The method further includes subsequent to producing the audio stream, receiving a request for the audio stream from a second client device. The method further includes transmitting the audio stream to the second client device responsive to the request.

An apparatus for producing an audio stream according to input received from a client device according to one implementation of this disclosure includes a memory and a processor. The processor executes instructions stored in the memory to transmit a user interface to the client device. The user interface includes one or more user interface elements for defining the input. The processor further executes instructions stored in the memory to receive, using the user interface, the input from the client device. The processor further executes instructions stored in the memory to, subsequent to receipt of the input, process the input to identify one or more tags associated with the input and to retrieve a first content item associated with the one or more tags from a database. The processor further executes instructions stored in the memory to process other content items against the one or more tags to determine that the first content item is associated with a second content item of the other content items and to retrieve the second content item from the database. The processor further executes instructions stored in the memory to determine, based on the one or more tags and at least one tag associated with the second content item, a content sequence for the first content item and the second content item. The processor further executes instructions stored in the memory to produce the audio stream according to the content sequence.

A method for producing an audio stream according to a content sequence for content items according to one implementation of this disclosure includes combining two or more candidate content items based on randomly selected tag combinations to produce candidate content sets. Each candidate content set reflects a candidate content sequence for the combined two or more candidate content items. The method further includes determining scores for ones of the candidate content sets based on tags of the randomly selected tag combinations. The method further includes selecting, as the content sequence, a candidate content sequence corresponding to a candidate content set having a highest one of the scores. The method further includes producing the audio stream according to the content sequence.

These and other aspects of this disclosure are disclosed in the following detailed description, the appended claims, and the accompanying figures.

BRIEF DESCRIPTION OF THE DRAWINGS

The description herein makes reference to the accompanying drawings, wherein like reference numerals refer to like parts throughout the several views.

FIGS. 6A and 6B are illustrations of examples of post-processed audio streams.

DETAILED DESCRIPTION

Figure 1:
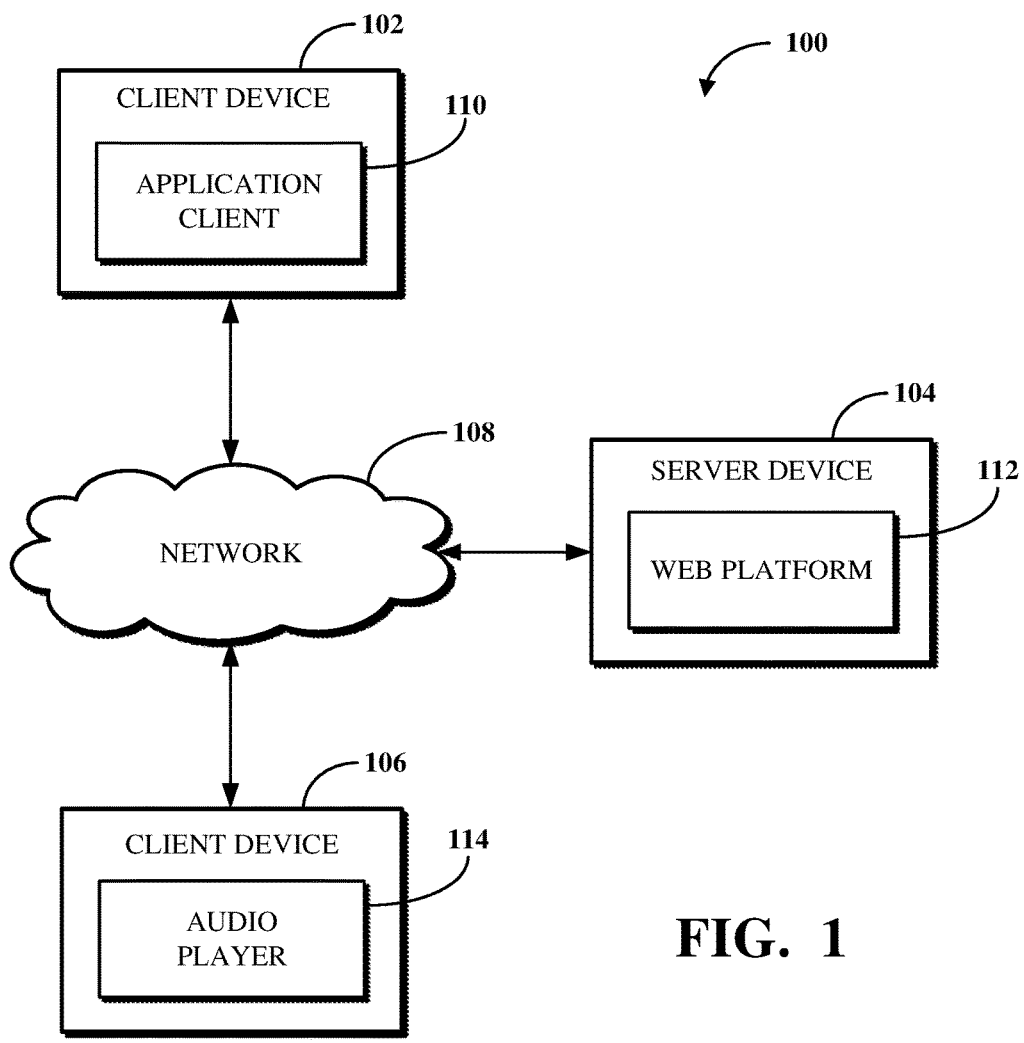
FIG. 1 is a block diagram of an example of a system for processing an audio stream including user-generated content.

There may be many audio recordings that can be mixed and combined to produce an audio stream for one or more purposes. In one example, an audio stream used to assist a person performing a workout routine can including a number of audio recordings that indicate how to perform an exercise, provide useful countdowns or repetition counts, or the like. A personal trainer can record a series of audio recordings, or content items, to be included in an audio stream. His or her client can listen to the audio stream when they perform a workout, such as to guide the client in the exercise routines in the personal trainer's absence. However, determining which types of content items to include in an audio stream, and in which order to arrange them within the audio stream, can be difficult.

For example, there may be a large number of content items that focus on different types of exercises, different regimens based on skill level, personalized routines that focus on a specific injury recovery or other physical concern, or the like, such that it can be difficult to determine which content items will be most useful to the client. Even if the physical trainer is able to determine within reason which content items will have the greatest impact on the workout routine for a particular client, the order in which to arrange them to optimize the workout routine is unclear. Furthermore, it may not be apparent to the personal trainer that certain types of content items are missing or that he or she has to produce them for a client.

Implementations of this disclosure address problems such as these by producing audio streams according to sequences of selected content items. A first content item can be identified based on user input indicating tags associated with it. A second content item, and a content sequence for ordering the first content item and second item, are identified based on scores determined for various candidate content items. An audio stream is produced according to the content sequence and may then be transmitted to a client device for playback. The audio stream may be overlaid with or otherwise included in a video stream such as to cause the content items included in the audio stream to be simultaneously played with content included in the video stream.

The tags are processed to select the content items to include in an audio stream. The tags include metadata usable to selectively identify content items that can be combined to produce an optimal audio stream, such as based on the types of content items, the number of content items, the purpose of the content items to the audio stream, or more. Missing content items can be detected and signaled for production using tags. An audio stream and content sequence therefore can be updated after initial production occurs. As used herein, a content item can refer to an audio recording including sounds, noise, or the like.

As used herein, a workout can refer to a cardiovascular exercise, a resistance exercise, a stretch exercise, or another exercise or set of such exercises. Throughout this disclosure, examples will make reference to producing an audio stream for a workout, such as where the content items to include in the audio stream correspond to audio cues for performing an exercise or otherwise related to physical activity. However, it is understood that the implementations of this disclosure may have application beyond the exercise space. For example, the implementations of this disclosure may be used to produce an instructional audio stream for learning a new trade or skill, to produce a musical audio stream including particular musical selections, or the like.

To describe some implementations in greater detail, reference is first made to examples of hardware structures which may be used. FIG. 1 is a block diagram of an example of a system 100 for audio stream production using sequences of select content. The system 100 includes a client device 102, a server device 104, and a client device 106. The client device 102 and the client device 106 are computing devices that can execute application software. Each of the client device 102 and the client device 106 may be a mobile device or a fixed device. For example, the client device 102 or the client device 106 can be a mobile device such as a smart phone, tablet computer, personal digital assistant, smart watch, or other portable or wearable device. In another example, the client device 102 or the client device 106 can be a fixed device such as a desktop computer, or other generally non-portable device.

The server device 104 is a computing device that communicates data with other computing devices. The server device 104 can be a server computer at a datacenter, such as a server installed within a rack. The server device 104 can execute instructions for software accessible using the client device 102, the client device 106, or both. The server device 104 can access data stored in a database or other data store, such as to maintain records of information received from, requested by, transmitted to, or otherwise communicated with the client device 102, the client device 106, or both.

A network 108 can be used for communications between ones of the client device 102, the server device 104, and the client device 106. The network 108 can include one or more wired or wireless versions of Internet, intranet, Ethernet, WiFi, Bluetooth®, radio frequency, near field communication (NFC), code division multiple access (CDMA), global system for mobile communications (GSM), long-term evolution (LTE), or the like. Communications over the network 108 can be facilitated using routers, switches relays, servers, or the like. The network 108 can be a local area network (LAN), a wide area network (WAN), a machine-to-machine network (MMN), a virtual private network (VPN), another type of network, or a combination thereof.

The client device 102, the server device 104, and the client device 106 execute software for producing and processing an audio stream. The client device 102 executes an application client 110 that facilitates communications of data between the client device 102 and the server device 104 over the network 108. More particularly, the server device 104 executes a web platform 112 that communicates data with the application client 110 over the network 108 to configure and produce an audio stream. The client device 106 executes an audio player 114 that receives an audio stream from the web platform 112 over the network 108.

The application client 110 is software used to configure information for producing an audio stream. The application client 110 can, for example, be a web browser or mobile application executing at the client device 102. A user of the client device 102 can use the application client 110 to access the web platform 112, such as to cause the web platform 112 to produce an audio stream or update an existing audio stream.

The web platform 112 is server-side software for producing and managing audio streams and content used to produce audio streams. The web platform 112 can include instructions for a website operated using one or more third-party services, for example, Amazon Web Services® (AWS). For example, the web platform 112 can include functionality for accessing data stored at third-party server devices. The web platform 112 can be a Java software program executed in a Linux® environment or another software program executed in another computing environment. The web platform may be a cloud based service implemented using an application server (e.g., a Java Virtual Machine (JVM)) and a database server (e.g., AWS).

The audio player 114 is a software program configured for playback of an audio stream. The audio player 114 can receive audio streams from the web platform 112. Alternatively, the client device 106 may also execute an application client (e.g., a web browser, a mobile application, etc.) that connects to and receives audio streams from the web platform 112. For example, the application client or audio player 114 (to the extent separate) executing at the client device 106 can transmit a call to the web platform 112 before playback of an audio stream begins, such as to verify that the audio stream is the correct audio stream to play (e.g., the most recently produced, for the correct user, etc.).

Implementations of the system 100 may differ from the examples described above with respect to FIG. 1. In some implementations, the client device 102 and the client device 106 may be the same client device. For example, the client device from which commands are received for producing an audio stream can be the same client device that receives a produced audio stream for playback. In some implementations, one or more of the client device 102, the server device 104, or the client device 106 may be a virtual device.

In some implementations, the client device 106 can be a wearable device. For example, the client device 106 can be implemented as a wristband, smartwatch, arm band, leg band, brace, ring, headband, headset, glasses, another wearable component, or a combination thereof. In such an implementation, the client device 106 can include a body configured to be coupled to a portion of a user. For example, the body can be a band wearable about a wrist, ankle, arm, or leg of a user of the client device 106.

In some implementations, the audio player 114 can be a video player or other media playback software. For example, the audio stream produced at the server device 104 can be played simultaneously with a video stream. In another example, the audio stream can be included as an audio track within a video stream.

Figure 2:
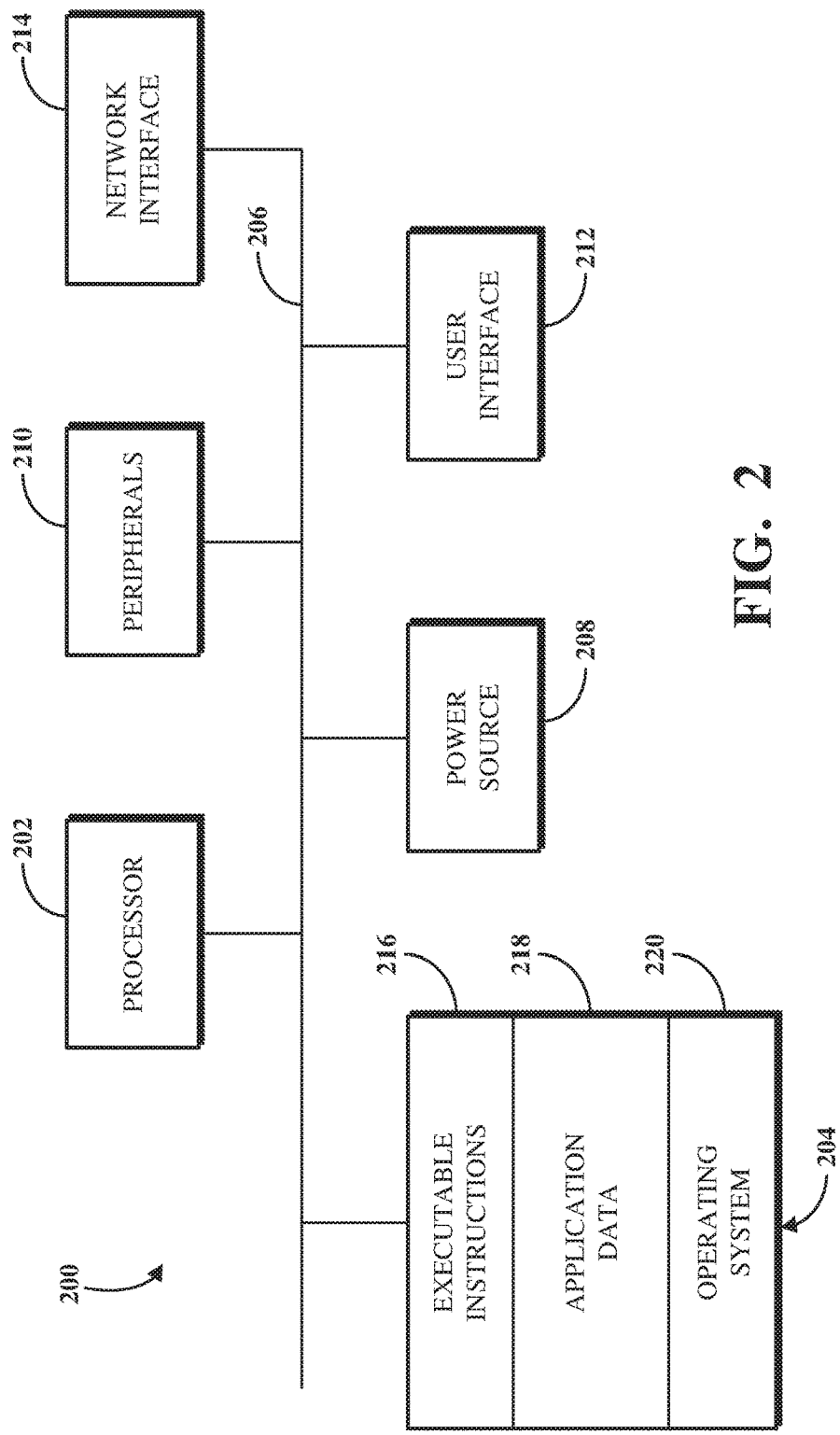
FIG. 2 is a block diagram of an example of an internal configuration of a computing device.

FIG. 2 is a block diagram of an example of an internal configuration of a computing device 200. The computing device 200 may, for example, be the client device 102, the server device 104, or the client device 106 shown in FIG. 1. The computing device 200 includes components or units, such as a processor 202, a memory 204, a bus 206, a power source 208, peripherals 210, a user interface 212, and a network interface 214. One of more of the memory 204, the power source 208, the peripherals 210, the user interface 212, or the network interface 214 can communicate with the processor 202 via the bus 206.

The processor 202 is a central processing unit (CPU), such as a microprocessor, and can include single or multiple processors having single or multiple processing cores. Alternatively, the processor 202 can include another type of device, or multiple devices, now existing or hereafter developed, configured for manipulating or processing information. For example, the processor 202 can include multiple processors interconnected in any manner, including hard-wired or networked, including wirelessly networked. For example, the operations of the processor 202 can be distributed across multiple devices or units that can be coupled directly or across a local area or other suitable type of network. The processor 202 can include a cache, or cache memory, for local storage of operating data or instructions.

The memory 204 includes one or more memory components, which may each be volatile memory or non-volatile memory. For example, the volatile memory of the memory 204 can be a DRAM module (e.g., DDR SDRAM) or another form of volatile memory. In another example, the non-volatile memory of the memory 204 can be a disk drive, a solid state drive, flash memory, Phase-Change Memory (PCM), or another form of non-volatile memory configured for persistent electronic information storage. The memory 204 may also include other types of devices, now existing or hereafter developed, configured for storing data or instructions for processing by the processor 202.

The memory 204 can include data for immediate access by the processor 202. For example, the memory 204 can include executable instructions 216, application data 218, and an operating system 220. The executable instructions 216 can include one or more application programs, which can be loaded or copied, in whole or in part, from non-volatile memory to volatile memory to be executed by the processor 202. For example, the executable instructions 216 can include instructions for producing, processing, or playing an audio stream. The application data 218 can include user data, database data (e.g., database catalogs or dictionaries), or the like. The operating system 220 can be, for example, Microsoft Windows®, Mac OS X®, or Linux®; an operating system for a small device, such as a smartphone or tablet device; or an operating system for a large device, such as a mainframe computer.

The power source 208 includes a source for providing power to the computing device 200. For example, the power source 208 can be an interface to an external power distribution system. In another example, the power source 208 can be a battery, such as where the computing device 200 is a mobile device or is otherwise configured to operate independently of an external power distribution system.

The peripherals 210 includes one or more sensors, detectors, or other devices configured for monitoring the computing device 200 or the environment around the computing device 200. For example, the peripherals 210 can include a geolocation component, such as a global positioning system (GPS) location unit. In another example, the peripherals can include a temperature sensor for measuring temperatures of components of the computing device 200, such as the processor 202.

The user interface 212 includes one or more input or output components. Examples of input our output components of the user interface 212 include a display, such as a liquid crystal display (LCD), a cathode-ray tube (CRT), a light emitting diode (LED) display (e.g., an OLED display), or other suitable display; a positional input device, such as a mouse, touchpad, touchscreen, or the like; a keyboard; or other suitable human or machine interface devices.

The network interface 214 provides a connection or link to a network, for example, a LAN, a WAN, an MMN, a VPN, or another public or private network. The network interface 214 can be a wired network interface or a wireless network interface. The computing device 200 can communicate with other devices via the network interface 214 using one or more network protocols, such as using Ethernet, TCP, IP, power line communication (PLC), Wi-Fi, Bluetooth®, infrared, GPRS, GSM, CDMA, other protocols, or a combination thereof.

Implementations of the computing device 200 may differ from the examples described above with respect to FIG. 2. In some implementations, the computing device 200 can omit the peripherals 210. In some implementations, the memory 204 can be distributed across multiple devices. For example, the memory 204 can include network-based memory or memory in multiple clients or servers performing the operations of those multiple devices. In some implementations, the application data 218 can include functional programs, such as a web browser, a web server, a database server, another program, or a combination thereof.

Figure 3:
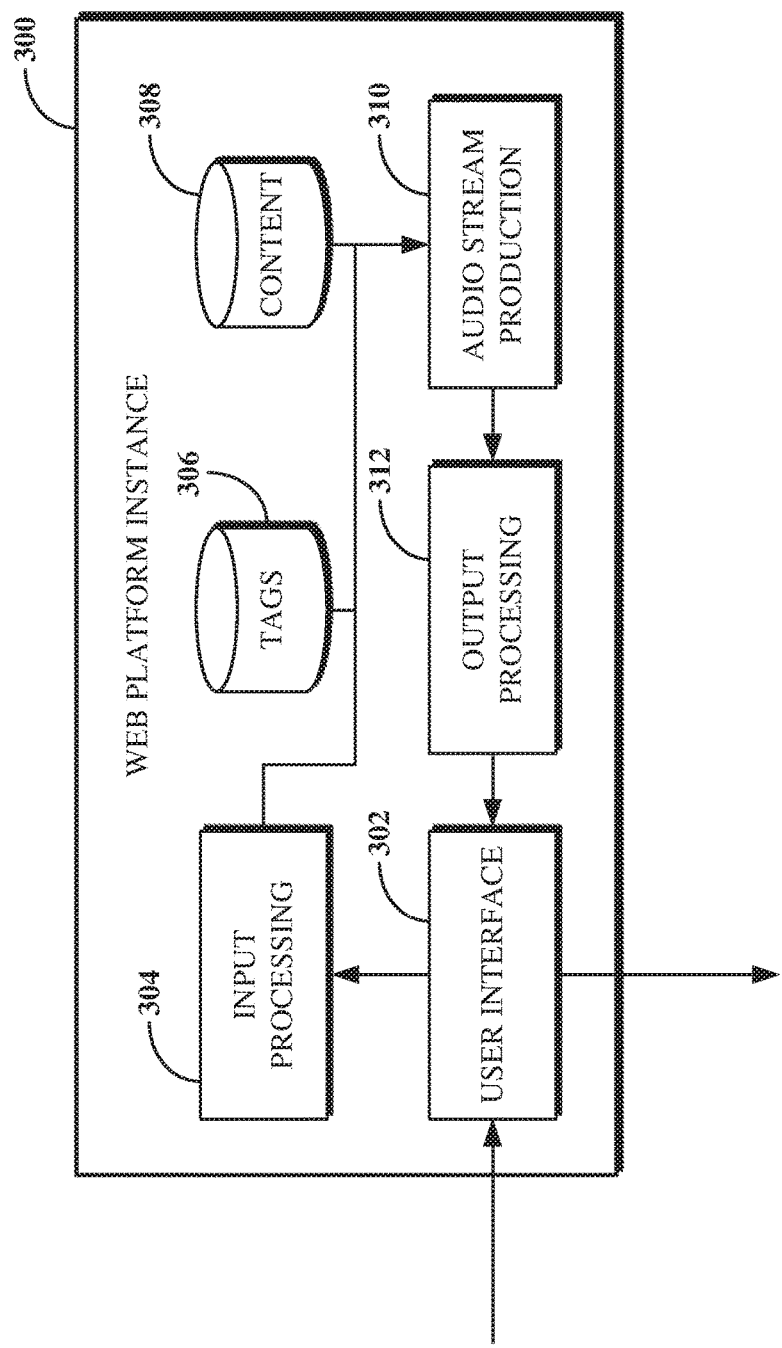
FIG. 3 is an illustration of an example of a pre-processed audio stream.

FIG. 3 is a block diagram of an example of a web platform instance 300 used to produce an audio stream. The web platform instance 300 is software executing on a computing device (e.g., the server device 104 shown in FIG. 1). The web platform instance 300 may reflect a single software component or a combination of software components (e.g., a client software component and a server software component). The web platform instance 300 can represent an instance of an online software platform accessible using a web browser of a client device, a mobile application executable on a client device, or the like. For example, the web platform instance 300 can represent a single instance of a web platform, which may be accessible to a defined set of one or more users. The web platform instance 300 includes a user interface 302, an input processing mechanism 304, a tags database 306, a content database 308, an audio stream production mechanism 310, and an output processing mechanism 312.

The user interface 302 is used to receive data from and transmit data to a client device that access the web platform instance 300. The user interface 302 may include a user interface mechanism that generates a graphical user interface for display at a client device (e.g., the client device 102 shown in FIG. 1). For example, the graphical user interface mechanism can produce data including rendering instructions for bounded graphical display regions, such as windows, or pixel information representative of controls, such as buttons and drop-down menus. The rendering instructions can, for example, be in the form of Hypertext Markup Language (HTML), Standard Generalized Markup Language (SGML), JavaScript, Jelly, AngularJS, or other text or binary instructions for generating a graphical user interface on a display that can be used to generate pixel information.

For example, a graphical user interface generated by the user interface mechanism of the user interface 302 can include a form for a user of a client device (e.g., the client device 102 shown in FIG. 1) to indicate information usable to identify content items to include in an audio stream. In another example, a graphical user interface generated by the user interface mechanism of the user interface 302 can include a playback section for a user of a client device (e.g., the client device 106 shown in FIG. 1) to interact with, such as to cause playback of an audio stream.

The input processing mechanism 304 processes input received using the user interface, such as to transform the input into a form usable by the audio stream production mechanism 310. For example, the input can filter irrelevant input data that is not usable to identify content items. In another example, the input processing mechanism 304 can convert the input from a standard text form to a coded or like form usable to identify content items to include in an audio stream. In yet another example, the input processing mechanism 304 can process the input to identify tags that will be used to identify content items to include in an audio stream.

The tags database 306 refers to a table in a relational database in which data associated with tags are stored. The content database 308 refers to a table in a relational database in which data associated with content items are stored. A tag refers to a collection of metadata associated with one or more content items stored in the content database 308. A tag includes a name, a weight, a description, and a relation type. The name is an identifier usable to locate the tag within the tags database 306. For example, the name can be an alphanumeric character string, such as "Content_123." The description is human-readable text that describes the content associated with the tag.

The weight is a number value between 0 and 1 that scales the relevance or importance of the associated content item. The weight may be used or have a form based on the particular manner in which it is used. For example, the weight may be used during an identification of content items that have not yet been generated or during a selection of content items to include in an audio stream. During the selection of content items to include in an audio stream, for example, the weight considers an additional factor reflecting a number of presently available content items for a given tag or combination of tags. The weight reflects a product of a degradation factor and a number of uses. The degradation factor is a number between 0 and 1 selected based on the relation type or other metadata associated with the tag or combination of tags. The number of uses reflects the number of available content items corresponding to the tag or combination of tags. Other formulas for determining the weight may also or instead be used.

The relation type defines how the tag relates to a content item stored in the content database 308. For example, the relation type can point to a particular table in the content database 308, a particular record stored in such a table, a specific time or range of times of an audio stream, a number of times to repeat an activity while the content item is played, or the like. For example, in the context of producing an audio stream including content items for a workout, the relation type Exercise_Library can refer to a database table that stores specific audio content items uploaded by a personal trainer. In another example, the relation type Twm_User can refer to a database table that stores data associated with users who play audio streams produced using the web platform instance 300. In yet another example, the relation type Phase_Type can refer to a defined phase of a workout (e.g., exercise, rest, get ready, introduction message/instructions, or the like).

Alternatively, a relation type can define a contextual indicator reflecting how to use certain content items in an audio stream. For example, the relation type can indicate a purpose for a tag. In the context of a workout, for example, the purpose can indicate that a tag is used to provide instructions for an exercise, suggest an exerciser switch the current side of their body being exercised, provide a countdown for beginning or ending an exercise, or display a message to be read by the exerciser.

In some cases, a tag may include additional metadata. For example, a tag may include one or more of an owner name, a source indicator, or a content indicator. The owner name indicates whether the tag is associated with a user of the web platform instance 300, and, if so, an identifier of that user. For example, there may be multiple content items for a push-up exercise, but each may be associated with a different personal trainer. The source indicator indicates how the tag was created. For example, the source indicator can reflect that a tag was derived by the web platform instance 300 without user intervention (e.g., based on data stored in the content database 308), that the tag is provided in a default configuration of the web platform instance 300, that the tag was generated by a user of the web platform instance 300, or the like. Other types of metadata may also or instead be used.

The content indicator indicates one or more specific content items stored in the content database 308, one or more users that created content items stored in the content database 308, or both. For example, the content indicator can indicate that the user Cienna generated a content item for instructing an exerciser to perform squats. The content indicator can also relate two pieces of data defined at the web platform instance 300. For example, a user can define a tag such that a content indicator relates a group of people to a user, a charity, a fundraiser event, a goal, or the like. The relationship can be leveraged by the audio stream production mechanism 310, such as to identify related content items based on the content indicator of the tag.

Referring still to an example where the web platform instance 300 is used to produce an audio stream for a workout, some tags correspond to specific phases of the workout. For example, a tag may correspond to a rest phase, an exercise phase, a numbered repetition phase (e.g., first, second, third, last, etc.), an instruction phase, or the like. The audio stream production mechanism 310 can process the tags from the tags database 306 to determine which types of content items are relevant at different phases of an audio stream. As such, the audio stream production mechanism 310 can select for inclusion in an audio stream content items associated with tags relevant to a given phase of the workout.

A tag may also include metadata reflecting that associated content item is specially produced for a particular user, such as based on the requests or needs of that user. For example, in the context of a workout, an exerciser may have specified to his or her physical trainer that he or she has recently exited a physical therapy routine and has special requirements with respect to certain exercise types. In another example, the exerciser may have engaged the physical trainer to improve his or her golf swing such that he or she wants to focus on exercises for improving particular muscle groups.

In addition to identifying tags relevant to particular phases of playback of an audio stream, the audio stream production mechanism 310 can identify content items based on relationships indicated in tags. For example, as described above, a tag can be defined to include a content indicator that relates a particular user of the web platform instance 300 with a particular event, campaign, or the like. For example, a tag can relate user Michael with the Girls Who Code Fundraiser Campaign. That tag can be processed by the audio stream production mechanism 310 to select content items associated with the tag for an audio stream to be produced for the user Michael. For example, the audio stream production mechanism 310 can include a message associated with the Girls Who Code Fundraiser Campaign in an audio stream produced for the user Michael.

Some content items may be associated with a tag indicating a particular time at which the content items should be played. For example, content items including an instructional message for performing an exercise is played at the beginning of an exercise phase. In another example, content items indicating that the exercise phase is halfway complete is played halfway through the exercise phase. In yet another example, content items including a countdown to the end of the exercise phase is played at the end of the exercise phase.

The audio stream production mechanism 310 produces an audio stream based on information received from the input processing mechanism 304, tags retrieved from the tags database 306, and content items received from the content database 308. In particular, the audio stream production mechanism 310 uses the information received from the input processing mechanism 304 to identify relevant tags in the tags database 306. The audio stream production mechanism 310 then uses the identified tags to identify relevant content items in the content database 308. The audio stream production mechanism 310 then includes the relevant content items in an audio stream and determines whether additional content items should be included.

The audio stream production mechanism 310 can query a database table that relates tags stored in the tags database 306 with content items stored in the content database 308. For example, the database table can indicate that content item X is associated with tag Y such that, upon identifying tag Y based on the processed input, content item X can also be identified. The audio stream production mechanism 310 can identify further content items, such as by querying one or both of the tags database 306 or the content database 308. For example, the audio stream production mechanism 310 can query the content database 308 for some or all content associated with a given tag or previously identified content items.

Queries to the tags database 306, the content database 308, or both can be performed using the Structured Query Language (SQL) or another query language. For example, a first SQL query can be used to retrieve from the content database 308 a content item that is associated with tags for a particular user, exercise, phase, or the like. In some cases, results of a query can be filtered (e.g., using Java, JavaScript, or other instructions) to remove irrelevant results. For example, where an audio stream is being produced for user Michael and a query retrieves content items associated with a particular exercise for user Michael and user Evan, a filter can prevent the content items associated with the user Evan from being included in the audio stream.

Using the web platform instance 300, an audio stream can be produced at a given time, such as upon receipt of a command from a user of a client device (e.g., the client device 102 shown FIG. 1), such as after that user has finished inputting configurations for the audio stream. Alternatively, the audio stream can be produced when a user of a client device (e.g., the client device 106 shown in FIG. 1) is ready to playback the audio stream. As a further alternative, the audio stream can be produced with initial content items included in it and later updated, such as where a user of a client device (e.g., the client device 102 or another client device) indicates to include further content items within the audio stream.

The output processing mechanism 312 includes functionality for processing audio streams produced or updated using the audio stream production mechanism 310. For example, the output processing mechanism 312 can store a newly produced or updated audio stream for later use, such as by a user of a client device at which the audio stream will be played (e.g., the client device 106 shown in FIG. 1). In another example, the output processing mechanism 312 can encode a newly produced or updated audio stream. In some cases, the output processing mechanism 312 can encode an audio stream before storing it. In yet another example, the output processing mechanism 312 can combine the audio stream with a video stream, such as to cause the audio stream to be played simultaneously with the video stream.

Subsequent to the production of an audio stream, the user interface 302 can receive a command to update the audio stream. For example, new content items may be generated which should be included in the audio stream, or there may be a change to the use case for the audio stream (e.g., in the context of a workout, the workout changes). The command can then be processed by the input processing mechanism 304 and then by the audio stream production mechanism 310, such as to update the previously produced audio stream according to the command. Additionally, subsequent to the production of an audio stream, the user interface 302 can receive a request for the audio stream, such as from a client device at which playback will occur. The user interface 302 can transmit the audio stream to the client device responsive to the request.

Implementations of the web platform instance 300 may differ from the examples described above with respect to FIG. 3. In some implementations, the input processing mechanism 304 can include functionality for receiving data used to generate new tags. For example, the user interface 302 can include a form or like interface element for receiving input from a user to define a new tag. The new tag is then stored in the tags database 306 for later use by the audio stream production mechanism 310.

In some implementations, the user interface 302 may display information associated with tags used to produce an audio stream. For example, after an audio stream is wholly or partially produced, the user interface 302 can output some or all metadata of one or more tags associated with the content items currently included in the audio stream. In such an implementation, a user of the web platform instance 300 can use the output metadata information to control the content items that may be further included in the audio stream.

In some implementations, one or both of the input processing mechanism 304 or the output processing mechanism 312 can be omitted. For example, data received using the user interface 302 can be transmitted directly to the audio stream production mechanism 310 without input processing. In another example, an audio stream produced using the audio stream production mechanism 310 can be made available for transmission to a client device using the user interface 302 without output processing.

In some implementations, a graphical user interface generated using a user interface mechanism (e.g., of the user interface 302) can include a wizard for guiding a user of the web platform instance 300 during content items generation. For example, the audio stream production mechanism 310 can transmit a message indicating that missing content items have been detected to a user. The user can use a wizard to generate the missing content items. For example, a first page of the wizard can prompt the user for title or other identifying information for the content items, a second page of the wizard can prompt the user to record an audio cue for the content items, and a third page of the wizard can prompt the user to select one or more tags with which the content items should be associated (to the extent the web platform instance 300 does not already make such association).

In some implementations, the web platform instance 300 can enforce a time to live or other data retention policy for culling content items stored in the content database 308. For example, a time to live policy of N days can be defined (e.g., by default or by a user of the web platform instance 300) for content items, after which time such content items are deleted (e.g., from the content database 308). In another example, different time to live policies can be defined for different content items.

In some implementations, the web platform instance 300 can include an audio stream database for storing audio streams produced using the audio stream production mechanism 310. For example, the web platform instance 300 can produce many audio streams at the same or different times. The audio streams may be stored in the audio stream database. A client device (e.g., the client device 106 shown in FIG. 1) may later receive one of the audio streams stored in the audio stream database, such as when playback is to occur.

Figure 4:
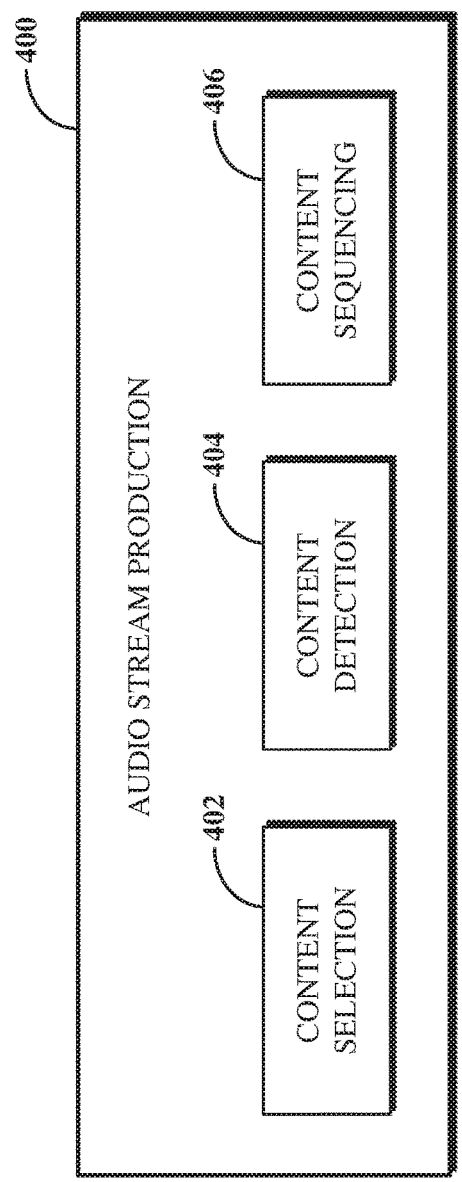
FIG. 4 is a block diagram of an example of a web platform instance used to produce an audio stream.

FIG. 4 is a block diagram of an example of an audio stream production mechanism 400. The audio stream production mechanism 400 is a software component including functionality for producing and audio stream. The audio stream production mechanism 400 may be included in a web platform instance or as a standalone software component. For example, the audio stream production mechanism 400 may be the audio stream production mechanism 310 shown in FIG. 3.

The audio stream production mechanism 400 includes a content selection mechanism 402, a content detection mechanism 404, and a content sequencing mechanism 406. The content selection mechanism 402 selects one or more content items for inclusion in an audio stream. The content selection mechanism 402 can select the one or more content items based on input received from a user of a client device (e.g., the client device 102 shown in FIG. 1) and tags identified using such input. For example, the content selection mechanism 402 can query a database table that relates tags with content items to select a first content item.

The content selection mechanism 402 uses a genetic algorithm as a machine learning tool to select content items not directly linked to tags identified based on input. The genetic algorithm identifies a second content item not already selected, but which to include in the audio stream, by creating a set of genes that represent a possible selection of content items. Each gene corresponds to a particular content item and thus a particular content phase. Each gene may thus also correspond to one or more tags (e.g., instruction, exercise, repetition, countdown, etc.).

For each phase of an audio stream, the content selection mechanism 402 randomly selects a purpose tag associated with content items that could be played at the beginning of that phase. In the event the selected purpose tag requires a secondary tag (e.g., an exercise tag where the selected purpose tag is an instructional tag), the secondary tag is selected to reflect the next content item that would play in such a phase. After a purpose tag is selected for each phase, the content selection mechanism 402 considers tags that correspond to other relation types (e.g., not purpose) and which are relevant to each given phase of the audio stream. For example, other tags can be considered which correspond to the same client as the selected purpose tag, the same exercise as the selected purpose tag, repetition tags for that same exercise, or the like.

Thus, for each phase, the content selection mechanism 402 randomly selects a combination of tags that define a particular content item. The content selection mechanism 402 then continues to process each phase to select follow-up or otherwise related content items, such as to communicate timing information within the audio stream. The content items for each of the phases is then combined to represent selected content to include in the audio stream.

For a given combination of tags, the individual content items selected using the content selection mechanism 402 and associated with those tags are assigned scores based on a count value and a degrading factor. The count value count reflects the total number of items of content currently associated with the given combination of tags. The degrading factor deg_factor is a number between 0 and 1 that defines how a score decreases as the count value increases. A maximum possible score max is a number between 0 and 1 defining the maximum possible score for the given combination of tags. The score for an individual content item may thus be calculated as score=(deg_factor^count)*max. The content selection mechanism 402 assigns a higher score for a content item if that type of content item has not already been selected for inclusion in the audio stream to be produced.

For example, in the context of producing an audio stream for a workout, a combination of tags can include the tags Instruction and Squat, where the degrading factor is 0.88 and the maximum possible score is 0.98. If there are no squat instructions already selected for inclusion in the audio stream, the score for a content item that instructs a user on how to perform a squat is score=(0.88^0)*0.98=0.98. However, if there is already one squat instruction selected for inclusion in the audio stream, the score is score=(0.88^1)*0.98=0.8624. Similarly, if there are already two squat instructions selected for inclusion in the audio stream, the score is score=(0.88^2)*0.98=0.758912.

Given that values of the degrading factor and maximum possible score are each between 0 and 1, a score determined for an individual content item is also between 0 and 1. However, other scaling amounts can be used for the degrading factor and for a score for an individual content item. For example, in some cases, the degrading factor can be between 1 and 100.

The content selection mechanism 402 thus selects content items for inclusion in an audio stream such that the generic content items can have a highest initial score. As more generic content items are filled out and, potentially, repeated, specific content items associated with specific types of tags (e.g., users, exercises, etc.) start to have greater initial scores than the generic content items.

The content items having the highest scores will be combined and used to produce the audio stream. In some cases, however, the combination of those content items having the highest scores may instead be used as a candidate audio stream collection. For example, N candidate audio stream collections can be prepared and then processed against one another to select an optimal one of those candidates. The optimal candidate may, for example, be the candidate having the highest overall score (e.g., reflected as the sum of the respective individual content scores).

A further description of a genetic algorithm used by the content selection mechanism 402 follows. An initial population of N audio streams is randomly generated. Each of those N audio streams is attributed a value based on scores of the content items it includes. Some of the "most fit" audio streams are then selected to be parents for new child audio streams (e.g., by a tournament-style selection process, which randomly selects a subset of a population and a most fit audio stream from that population subset). Producing a new child audio stream includes combining its parent audio streams, such as by randomly selecting content items for each time index from one of those parent audio streams.

As a result, a new population is created with M audio streams, where M may or may not equal N. Given that the child audio streams comprising the new population were generated based on the most fit audio streams from the preceding population, the new population is presumed to have a higher overall average fitness level than the preceding population. This process repeats until the overall average fitness level of a successive population either ceases to increase or increases by an amount that does not meet a minimum threshold. For example, in the event that X (e.g., five) continuous successive populations have the same higher overall average fitness level, the genetic algorithm terminates. After the genetic algorithm terminates, the audio stream having the highest fitness level within the last successive population is selected.

The content items selected for inclusion by the content selection mechanism 402 are used by the content detection mechanism 404 to detect whether further content items are to be included in the audio stream to be produced. The selected content items can be reflected in a prioritized list of content items. The content detection mechanism 404 can compare the content items included in the list of content items with content items stored in a system in which the audio stream production mechanism 400 is implemented (e.g., the web platform instance 300 shown in FIG. 3).

In the event one or more of the content items of the list of content items are not available within that system, the content detection mechanism 404 generates a message to cause the detected content items to be generated (e.g., by transmitting the message to a user of a client at which the content items will be generated). The message can include instructions to generating the content. For example, where the content item is an instructional audio cue indicating how to perform a particular exercise, the message can include instructions indicating what a person generating the content should say when recording the audio cue.

Where a user of a client device is using the client device to produce an audio stream, the message can trigger one or more sensors of the client device to become available to generate the detected missing content item. For example, the message can be viewed using a display of the client device. The message can include a "record now" or like option which, if selected, will prompt the user of the client device to generate the content item. For example, where the client device is a mobile phone, the message can trigger a microphone of the mobile phone to become available to record the content item.

Upon receiving such a message, the user of the client device may perform one of several actions. For example, the user may generate the content item, re-record the content item (e.g., where a previous attempt at recording was inadequate), or ignore the message and not generate the content item. In the event the user indicates to ignore the message and not record the content item (e.g., by deleting the message, interacting with a user interface element on a display on the client device to ignore the message, or the like), the content item will be removed from consideration in the audio stream.

Content items generated responsive to a missing content detection are received by the audio stream production mechanism 400 from the client device at which the content items are generated and processed, such as to associate the content items with one or more tags. The tags may be tags already stored in a tags database (e.g., the tags database 306 shown in FIG. 3). Associating the content items with the one or more tags can include adding a record to a database table that relates content with tags available for use by the audio stream production mechanism 400.

In some cases, the content detection mechanism 404 detects that content items are omitted where the audio stream is being produced for a particular user (e.g., an exerciser) and other content items not already selected is tagged for that user. For example, a personal trainer can record instructional exercise content items for his or her client, Evan. If the audio stream production mechanism 400 is being used to produce an audio stream for Evan, but that instructional exercise content item has not already been selected for inclusion in the audio stream, the content detection mechanism 404 can identify such content item (e.g., by querying a database, such as the content database 308 shown in FIG. 3, based on an identifier of the user Evan) and select it for inclusion.

The content sequencing mechanism 406 determines a content sequence for ordering the content items selected for inclusion in the audio stream by the content selection mechanism 402 and content items generated responsive to missing content item detection by the content detection mechanism 404. The content sequence reflects an optimal ordering of the content items to include in the audio stream. The content sequencing mechanism 406 can determine the content sequence based on the types of content items to include in the audio stream.

For example, a first content item may be an instructional audio recording on how to perform a squat. A second content item may be an indication that the squat exercise phase is halfway complete. A third content item may be an audio recording from a friend or family member of the exerciser including a personal message for encouraging the exerciser to complete the exercise. Based on the tags associated with the first content item, second content item, and third content item, the content sequencing mechanism 406 can arrange the first content item, second content item, and third content item in a particular order. For example, the first content item can be determined to be first in the content sequence since it informs how to perform the exercise for the given phase. The second content item can be second in the content sequence since it indicates a time elapsed for that phase. The third content item can be third in the content sequence so as to provide encouragement for the exerciser towards the end of the phase.

In some cases, the content sequencing mechanism 406 can determine a content sequence for an audio stream based on the tags associated with the content items to include in the audio stream. For example, a tag may indicate that an associated content item is to be played at the beginning of a first exercise phase. In another example, a tag may indicate that an associated content item is to be played between exercise phases one and two. The content sequencing mechanism 406 can consider these tags to determine the content sequence.

Implementations of the audio stream production mechanism 400 may differ from the examples described above with respect to FIG. 4. In some implementations, one or more of the content selection mechanism 402, the content detection mechanism 404, or the content sequencing mechanism 406 can be combined. For example, the audio stream production mechanism 400 may be or otherwise include a single mechanism for selecting and detecting the content items to include in an audio stream, determining a content sequence for the selected content items, and producing the audio stream according to the content sequence. In another example, the content selection mechanism 402 can include functionality for determining content sequences, and the content sequencing mechanism 406 can be omitted.

In some implementations, a database table storing binary values indicating whether content items exist for a particular content type can be used by the content detection mechanism 404. For example, in the context of producing an audio stream for a workout, the database table can indicate whether the web platform instance stores data associated with a particular exercise type (e.g., squats, push-ups, etc.). In the event a record in that database table indicates that a content item does not exist yet for an exercise type, the content detection mechanism 404 can generate a message requesting that content be produced for that exercise type. That message may then be transmitted to a client device (e.g., the client device 102 shown in FIG. 1 or another client device) at which the content items can be produced.

In some implementations, the content selection mechanism 402 can use machine learning functionality other than that of a genetic algorithm. For example, the content selection mechanism 402 can use a neural network that learns relationships between tags, content items, or both and identifies a second content item for selection based on those relationships. Further types of machine learning are also usable with the content selection mechanism 402.

In some implementations, the score determined for an individual content item may be calculated other than described above. For example, instead of using a degrading factor to reflect lowering score values based on a count value, a factor for increasing score values can be used. Other changes to this calculation or other calculations are possible.

In some implementations, the content detection mechanism 404 may not generate a message to cause detected missing content item to be generated unless a score for such detected missing content item meets a threshold. For example, the detected missing content item can be a content item selected for inclusion in an audio stream using the content selection mechanism 402. The content selection mechanism 402 assigns such detected missing content item a score, as described above. In determining whether to generate a message for such detected missing content item, the content detection mechanism 404 can compare the score for such detected missing content item to the threshold. If the score meets the threshold (e.g., by exceeding a minimum score threshold value), a message is generated. Otherwise, a message is not generated.

In some implementations, the content detection mechanism 404 may be used for purposes other than to produce an audio stream. For example, the content detection mechanism 404 can be used to identify that content items do not exist for a particular content type, user, or the like. For example, in the context of a workout, the content detection mechanism 404 can determine that a content database in which content items are stored does not include an audio cue for instructing a user how to perform a push-up. The content detection mechanism 404 can then indicate a request for such content to a user of a client device, such as to cause that user to generate the content items.

In some implementations, the content detection mechanism 404 can perform operations for detecting missing content items before the content selection mechanism 402 selects content items to include in the audio stream. For example, before content items are selected by the content selection mechanism 402, the content detection mechanism 404 can query a database accessible to the web platform instance including the audio stream production mechanism 400, such as to identify whether particular content items are omitted (e.g., based on content type, relation type, description, or the like).

In some implementations, a user of the web platform instance including the audio stream production mechanism 400 can manually override selections, detections, sequences, or a combination thereof, as resulting from operations performed by the content selection mechanism 402, the content detection mechanism 404, or the content sequencing mechanism 406. For example, a user who is using the web platform instance to produce an audio stream with certain content items may review the list of content items selected using the content selection mechanism 402. The user may then selectively remove or add content items to the list of content items selected using the content selection mechanism 402, such as to further customize the content items that will be included in the audio stream. In another example, the user of the web platform instance can selectively position the content items by modifying the content sequence produced by the content sequencing mechanism 406 or otherwise by deleting that content sequence and creating a new content sequence.

In some implementations, multiple users of a web platform instance (or of multiple web platform instances) can produce content items to include in an audio stream. For example, in the context of an audio stream produced for a workout, a first user may be a physical trainer who is producing content items related to the specific exercises an exerciser will perform. A second user may be a friend, family member, or colleague of the exerciser who is producing content items to encourage, or otherwise provide a social communication to, the exerciser during or in between exercise phases of the workout.

In some implementations, the content items may be or otherwise include advertisements selected based on known preferences of the user who will receive the audio stream for playback. For example, the known preferences may be obtained through a client profile the user maintains with the web platform instance including the audio stream production mechanism 400.

In some implementations, the audio stream production mechanism 400 can prioritize certain selected content items over others depending on a number of times that a particular content item has been included in audio streams for a user. For example, a particular user may have played several audio streams each including instructions for performing a push-up. Those audio streams may have omitted a social content item recorded by a friend of the user because there was not enough space to include it in those audio streams. The next time an audio stream that would include the push-up instruction content item is being produced, the push-up instruction content item may be omitted and the previously omitted social content item included. This may, for example, be because the user no longer needs instruction on an exercise he or she has performed several times.

Figure 5:
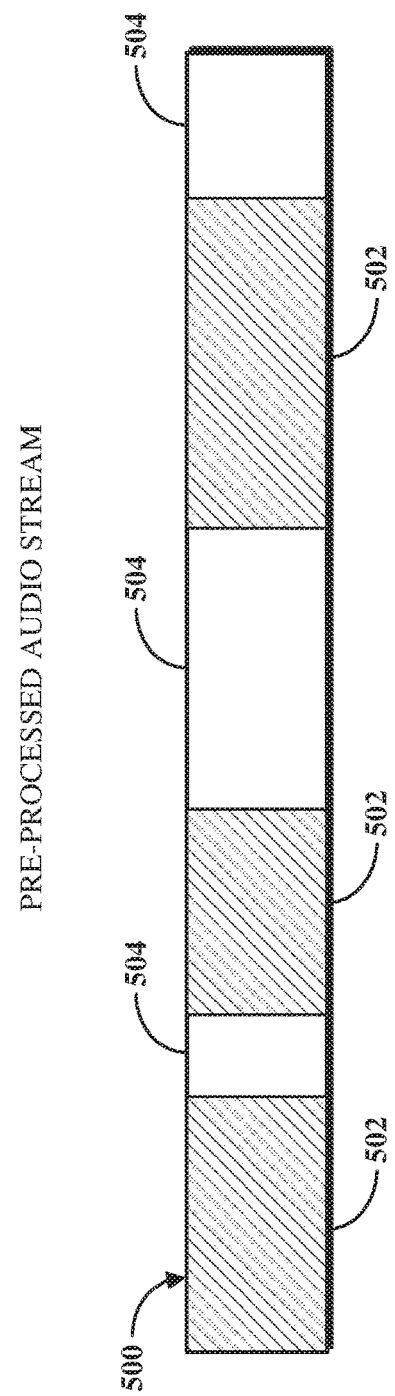
FIG. 5 is a block diagram of an example of an audio stream production mechanism.

To further describe some implementations in greater detail, reference is next made to example illustrations of audio streams which may be produced using the hardware and software described above with respect to FIGS. 1-4. FIG. 5 is an illustration of an example of a pre-processed audio stream 500. The pre-processed audio stream 500 represents an audio stream that has not yet been produced or updated using an audio stream production mechanism (e.g., the audio stream production mechanism 400 shown in FIG. 4). Thus, although the pre-processed audio stream 500 is referred to as an audio stream, the pre-processed audio stream 500 may instead refer to content that will eventually be included in an audio stream. The pre-processed audio stream 500 includes content phases 502 and empty phases 504. The content phases 502 represent periods of time of the pre-processed audio stream 500 at which content will be played. The empty phases 504 represent periods of time of the pre-processed audio stream 500 at which no content will be played.

FIGS. 6A and 6B are illustrations of examples of post-processed audio streams 600A, 600B. Each of the post-processed audio stream 600A and the post-processed audio stream 600B represents an example of how the pre-processed audio stream 500 shown in FIG. 5 may be after processing using an audio stream production mechanism (e.g., the audio stream production mechanism 400 shown in FIG. 4). The post-processed audio stream 600A includes first content phases 602A and second content phases 604A. The first content phases 602A correspond to the content phases 502 shown in FIG. 5 and thus represent periods of time of the post-processed audio stream 600A for which content was already designated. The second content phases 604A correspond to the empty phases 504 shown in FIG. 5 and thus represent periods of time that were previously free of content, but which, subsequent to processing using the audio stream production mechanism, include content.

Separately, the post-processed audio stream 600B includes first content phases 602B and second content phases 604B. The first content phases 602B represent periods of time of the post-processed audio stream 600B at which previously selected content (e.g., the content of the content phases 502) will be played. However, the first content phases 602B are different from the content phases 502, thus reflecting that the content of the content phases 502 was re-ordered in a content sequence when the post-processed audio stream 600B was being produced using the audio stream production mechanism. The second content phases 604B represent periods of time at which other content not previously selected for inclusion will be played.

To further describe some implementations in greater detail, reference is next made to examples of techniques for audio stream production using sequences of select content. The techniques described herein can be executed using computing devices, such as included within or otherwise using the systems, mechanisms, and devices described with respect to FIGS. 1-4. The techniques described herein can be performed, for example, by executing a machine-readable program or other computer-executable instructions, such as routines, instructions, or programs described according to Java, JavaScript, C++, or other such routines or instructions. The steps, or operations, of the techniques described herein or any other technique, method, process, or algorithm described in connection with the implementations disclosed herein can be implemented directly in hardware, firmware, software executed by hardware, circuitry, or a combination thereof Although the techniques described herein are each shown as a series of operations for clarity, implementations of those techniques or any other method, technique, process, and/or algorithm described in connection with the implementations disclosed herein can be performed in various orders and/or concurrently. Additionally, operations in accordance with this disclosure can be performed with other operations not presented and described herein. Furthermore, one or more aspects of the systems and techniques described herein can be omitted.

Figure 7:
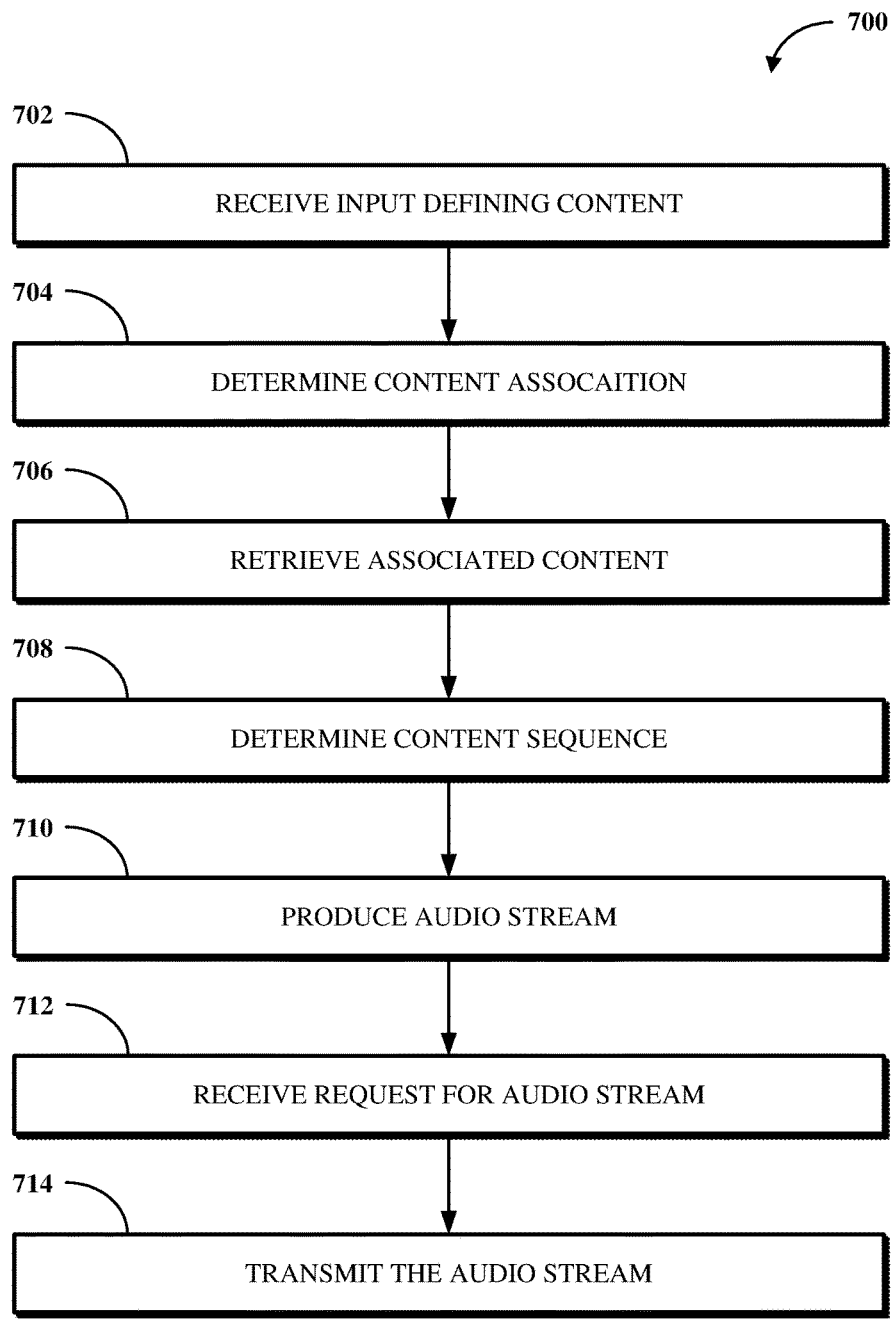
FIG. 7 is a flowchart illustrating an example of a technique for audio stream production using sequences of select content.

FIG. 7 is a flowchart illustrating an example of a technique 700 for audio stream production using sequences of select content. The technique 700 may, for example, be performed using the web platform instance 300 shown in FIG. 3. At 702, input is received from a first client device. The input defines a first content item to include in the audio stream to be produced. The input indicates tags associated with a content type of the first content item. For example, the input can include information usable to identify the tags in a tags database. The tags may then be used to identify the first content item in a content database.

At 704, an association between the first content item and a second content item is identified. The first content item and second content item are determined to be associated based on the tags that are associated with the first content item. Determining that the first content item is associated with the second content item can include determining scores for each of a collection of candidate content items and selecting the candidate content item having the highest score as the second content item. The scores can be determined based on randomly selected combinations of tags that are associated with different ones of the candidate content items.

For example, the scores can reflect a degree to which a candidate content item is closely related to or otherwise associated with the first content item. For example, where the first content item is an audio cue for instructing an exerciser how to perform a squat, a second content item that is an audio cue for indicating a number of squat repetitions to perform will have a higher score than a third content item that is an audio cue for counting down a number of seconds to hold a plank in position.

At 706, responsive to determining that the first content item is associated with the second content item, retrieving the second content item from a database. For example, retrieving the second content item from the database can include querying the database using one or more tags associated with the second content item.

At 708, a content sequence is determined for the first content item and the second content item. Determining the content sequence can include comparing the scores determined for the candidate content items to determine an optimal ordering of the first content item and the second content item. For example, a score for a combination where the first content item comes before the second content item may be higher than a score for a combination where the first content item comes after the second content item.

In some cases, the scores can be determined for sets of candidate content items randomly identified based on the different tags that are associated with the candidate content items included the respective sets. In such a case, an order for the content items included in a given set of candidate content items is determined based on the tags that are associated with those content items.

At 710, an audio stream is produced according to the content sequence. Producing the audio stream according to the content sequence can include generating a new audio stream where an order of the content items to include in that new audio stream is defined by the content sequence. Alternatively, where a portion of a content sequence is already generated, the content items not already included can be inserted within the audio stream in positions according to the content sequence.

At 712, subsequent to the audio stream being produced, a request for the audio stream is received from a second client device. For example, the second client device can be a client device including functionality for playback of an audio stream. At 714, the audio stream is transmitted to the second client device responsive to the request.

In some implementations, receiving the input can include generating content based on the input. For example, the web platform instance through which the input is received may be configured with one or more content definitions usable to populate the content database with content items. The input received from the client device can be used to identify that a content item associated with a content definition is to be generated and stored in the content database.

In some implementations, producing the audio stream can include combining the audio stream with a video stream. For example, the video stream can be selected by the web platform instance or received from a user of a client device that accesses the web platform instance. The combined stream can then be transmitted to the second client device, for example, instead of the audio stream alone.

In some implementations, the technique 700 includes detecting that a content item is missing and updating a previously-produced audio stream to include the missing content item. For example, the technique 700 can include detecting that a third content item is not available for inclusion in the audio stream by querying the content database or the tags database using one or more of the tags associated with the first content, the second content, or other content already included in the audio stream. For example, a query can be processed against a collection of content items stored in a content database to determine that the content database does not store the third content item.

Responsive to detecting that the third content item is not available, a message can be transmitted to a client device (e.g., the first client device from which the input was earlier received) to request the third content item. The third content item may, for example, be generated at or using that client device. Responsive to the message, the third content item can be received and used to adjust the previously-determined content sequence, such as to produce an adjusted content sequence. The audio stream can then be updated to include the third content item according to the adjusted content sequence.

In some implementations, the audio stream can be updated after being produced without first detecting missing content items. For example, another client device can log into the web platform instance and transmit input defining another content item to include in the previously-produced audio stream. That input can be processed to produce an adjusted content sequence, which is then used to update the audio stream.

Figure 8:
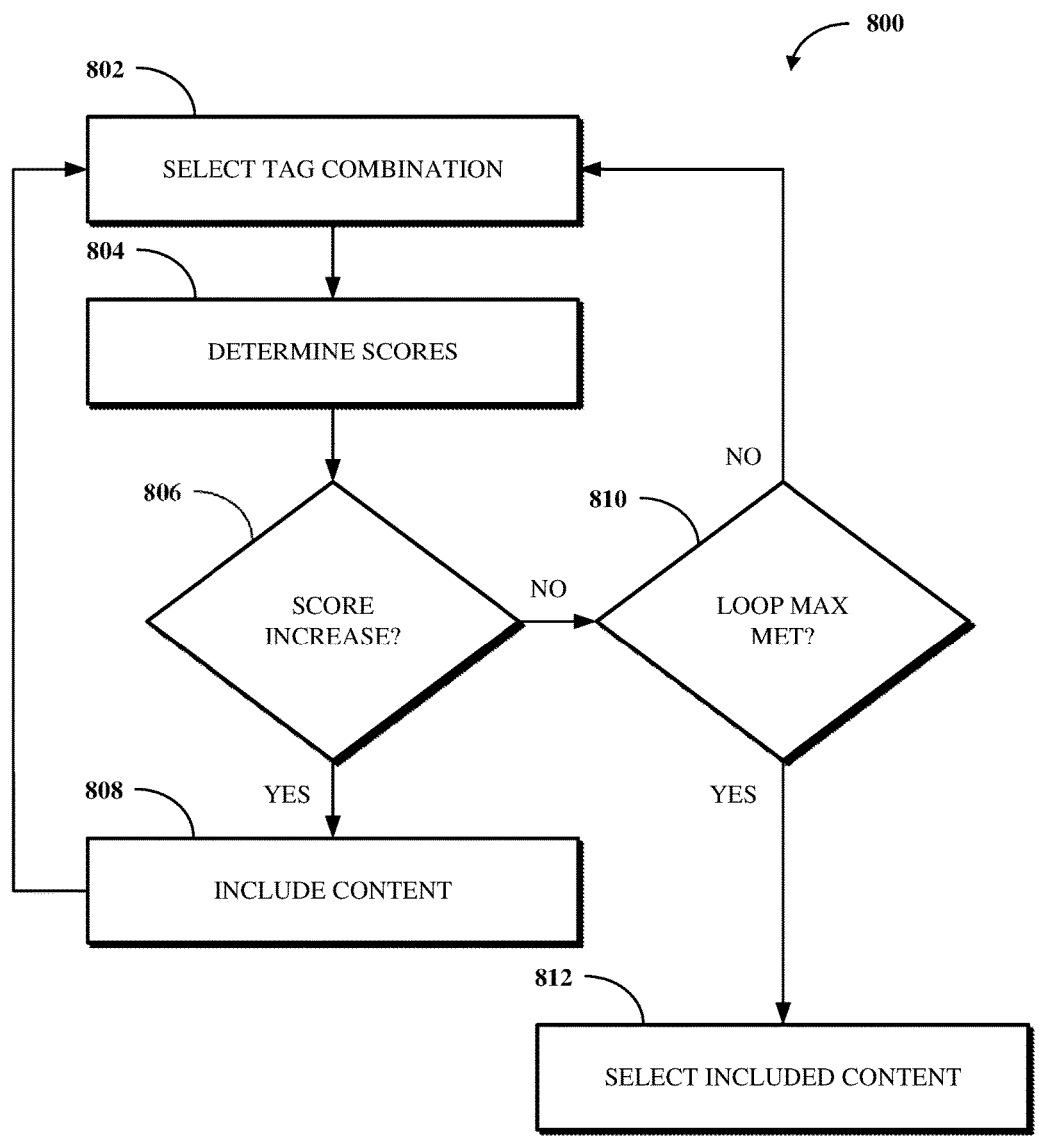
FIG. 8 is a flowchart illustrating an example of a technique for selecting content to include in an audio stream

FIG. 8 is a flowchart illustrating an example of a technique 800 for selecting content to include in an audio stream. The technique 800 may, for example, be performed using one or both of the content selection mechanism 402 or the content sequencing mechanism 406 shown in FIG. 4. At 802, a tag combination is selected. The tag combination can include tags associated with multiple items of content, which may already be generated or which may be referenced but not yet generated. Each of the items of content can have multiple tags associated with it such that the tag combination can include multiple sets of tags. The first tag combination (e.g., selected during a first performance of operations at 802) are tags associated with generic content items. Subsequent tag combinations that may be selected can be associated with more specific content items, for example, content items associated with a specific exercise, user, or the like.

At 804, scores are determined for the content items associated with the tags of the tag combination. In particular, the scores for sets of candidate content items (e.g., including a first content item, a second content item, and others), or for individual content items (as applicable), are determined based on randomly selected combinations of tags associated with respective ones of the candidate content items. For example, a score can be calculated based on a count value and a degrading factor. The count value represents a number of content items currently selected for inclusion in the audio stream and which are associated with at least some of the randomly selected combination of tags. The degrading factor represents a value defining a rate for adjusting a score for a candidate content item of the candidate content items based on the count value. The set of candidate content items, or the individual candidate content item (as applicable), is selected as the one having the highest calculated score.

At 806, a determination is made as to whether the scores determined for the items of content reflect an increase over previously determined scores. For example, during a first performance of the technique 800, the initial score may be 0 or "no value" since scores have not been calculated until now. However, during a second or subsequent performance of the technique 800, the newly determined score for the selected content item or set thereof is compared against the previous score. At 808, responsive to determining that the scores reflect an increase, the items of content are included in a list of content. The technique 800 then returns to 802 where another tag combination is selected.

At 810, responsive to determining that the scores do not reflect an increase, a determination is made as to whether a threshold number of tag combinations have been consecutively evaluated without inclusion. The threshold may, for example, be three, four, five, or another number. The threshold number of tag combinations is met where scores are determined for the threshold number of tag combinations and consecutively determined to not reflect an increase over previously determined scores.

Responsive to a determination that the threshold number of tag combinations have not been consecutively evaluated without inclusion, the technique 800 returns to 802 where another tag combination is selected. Responsive to a determination that the threshold number of tag combinations have been consecutively evaluated without inclusion, at 812, the content items that have been added to the list of content are selected as the content selected for inclusion in the audio stream.

In some implementations, the technique 800 can be include selecting content based on initial configurations with respect to an audio stream to produce. For example, in the context of producing an audio stream for a workout, a personal trainer or other person who wants to create a workout routine for an exerciser can indicate that the workout routine should include a warm-up phase, a squat exercise phase, a push-up phase, and a cool-down phase. For each given phase configured by that personal trainer or other person, the tag combinations that are selected and evaluated will be include tags that are associated with such given phase. For example, in selecting content to include in the squat exercise phase of the workout routine, only tags associated with squat exercises are considered.

The implementations of this disclosure can be described in terms of functional block components and various processing operations. Such functional block components can be realized by any number of hardware or software components that perform the specified functions. For example, the described implementations can employ various integrated circuit components (e.g., memory elements, processing elements, logic elements, look-up tables, and the like), which can carry out a variety of functions under the control of one or more microprocessors or other control devices. Similarly, where the elements of the described implementations are implemented using software programming or software elements, the systems and techniques can be implemented with any programming or scripting language, such as C, C++, Java, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques could employ any number of conventional techniques for electronics configuration, signal processing or control, data processing, and the like. The words "mechanism" and "element" are used broadly and are not limited to mechanical or physical implementations, but can include software routines in conjunction with processors, etc. Likewise, the terms "module" or "monitor" as used herein and in the figures may be understood as corresponding to a functional unit implemented using software, hardware (e.g., an application-specific integrated circuit), or a combination of software and hardware. In certain contexts, such modules or monitors may be understood to be a processor-implemented software module or software-implemented monitor that is part of or callable by an executable program, which may itself be wholly or partly composed of such linked modules or monitors.

Implementations or portions of implementations of the above disclosure can take the form of a computer program product accessible from, for example, a computer-usable or computer-readable medium. A computer-usable or computer-readable medium can be any device that can, for example, tangibly contain, store, communicate, or transport a program or data structure for use by or in connection with any processor. The medium can be, for example, an electronic, magnetic, optical, electromagnetic, or semiconductor device. Other suitable mediums are also available. Such computer-usable or computer-readable media can be referred to as non-transitory memory or media, and can include RAM or other volatile memory or storage devices that can change over time. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method for producing and transmitting an audio stream, the method comprising:
    receiving, from a first client device, input defining a first content item to include in the audio stream, the input indicating one or more tags associated with one or more content types of the first content item;
    identifying candidate content items to include in the audio stream by using a genetic algorithm to iterate through combinations of tags representative of the candidate content items, wherein the combinations of tags omits the one or more tags, wherein the candidate content items omits the first content item, wherein using the genetic algorithm to iterate through the combinations of tags includes, for each of the combinations of tags:
        randomly selecting the combination of tags, the combination of tags including a purpose tag representing a candidate content item of the candidate content items;
        determining, as a count value, a number of content items currently selected for inclusion in the audio stream and which are associated with the purpose tag, wherein the number of content items currently selected for inclusion in the audio stream includes the first content item;
        determining, as a degrading factor, a value defining a rate for adjusting a score for the candidate content item based on the count value; and
        determining the score for the candidate content item based on the count value and the degrading factor;
    identifying one of the candidate content items as a second content item based on a determination that the one of the candidate content items has a highest one of the scores;
    responsive to identifying the one of the candidate content items as the second content item, retrieving the second content item from a database;
    determining, based on the one or more tags and at least one tag associated with one or more content types of the second content item, a content sequence for the first content item and the second content item;
    producing the audio stream according to the content sequence;
    subsequent to producing the audio stream, receiving a request for the audio stream from a second client device; and
    transmitting the audio stream to the second client device responsive to the request.

2. The method of claim 1, wherein the scores are determined for sets of the candidate content items randomly identified based on tags associated with the candidate content items, wherein determining the content sequence for the first content item and the second content item comprises:
    determining that a first set of candidate content items in which the first content item is ordered before the second content item has a higher one of the scores than a second set of candidate content items in which the first content item is ordered after the second content item.

3. The method of claim 2, wherein an order of content items included in a set of candidate content items is determined based on the tags associated with the content items included in the set of candidate content items.

4. The method of claim 1, wherein producing the audio stream according to the content sequence comprises combining the audio stream with a video stream to produce a combined stream,
    wherein transmitting the audio stream to the second client device responsive to the request comprises transmitting the combined stream to the second client device responsive to the request.

5. The method of claim 1, further comprising:
    detecting that a third content item is not available for inclusion in the audio stream by querying the database based on at least some of the one or more tags; and
    responsive to the detecting, transmitting a message to the first client device to request the third content item.

6. The method of claim 5, further comprising:
    receiving the third content item responsive to the message;
    adjusting the content sequence based on the third content item to produce an adjusted content sequence; and
    updating the audio stream to include the third content item according to the adjusted content sequence.

7. The method of claim 1, wherein a tag of the one or more tags includes metadata defining a name, relation type, weight, and description associated with the first content item.

8. The method of claim 7, wherein the metadata further defines at least one of a content indicator associated with the first content item, an owner name associated with the first content item, or a source indicator associated with the first content item.

9. An apparatus for producing an audio stream according to input received from a client device, the apparatus comprising:
    a memory; and
    a processor,
    wherein the processor executes instructions stored in the memory to:
        transmit a user interface to the client device, the user interface including one or more user interface elements for defining the input;
        receive, using the user interface, the input from the client device;
        subsequent to receipt of the input, process the input to identify one or more tags associated with the input and to retrieve a first content item associated with the one or more tags from a database;
        identify candidate content items to include in the audio stream by using a genetic algorithm to iterate through combinations of tags representative of the candidate content items, wherein the combinations of tags omits the one or more tags, wherein the candidate content items omits the first content item, wherein the instructions to use the genetic algorithm to iterate through the combinations of tags include instructions to, for each of the combinations of tags:
            randomly select the combination of tags, the combination of tags including a purpose tag representing a candidate content item of the candidate content items;
            determining, as a count value, a number of content items currently selected for inclusion in the audio stream and which are associated with the purpose tag, wherein the number of content items currently selected for inclusion in the audio stream includes the first content item;
            determining, as a degrading factor, a value defining a rate for adjusting a score for the candidate content item based on the count value; and
            determining the score for the candidate content item based on the count value and the degrading factor;
        identify one of the candidate content items as a second content item based on a determination that the one of the candidate content items has a highest one of the scores;
        retrieve the second content item from the database;
        determine, based on the one or more tags and at least one tag associated with the second content item, a content sequence for the first content item and the second content item; and
        produce the audio stream according to the content sequence.

10. The apparatus of claim 9, wherein the instructions include instructions to:
    detect that a collection of content items omits the first content item by querying the database based on tags associated with content items of the collection of content items;
    responsive to a detection that the collection of content items omits the first content item, transmit a message including a request for the first content item to the client device;
    receive the first content item responsive to the message; and
    store the first content item in the database, wherein the input is received from the client device subsequent to a storage of the first content item in the database.

11. The apparatus of claim 9, wherein the client device is a first client device and the input is first input, wherein the instructions include instructions to:
    subsequent to a production of the audio stream, receive second input from a second client device, the second input defining a third content item to include in the audio stream;
    process the second input to determine an adjusted content sequence for the first content item, the second content item, and the third content item; and
    update the audio stream to include the third content item according to the adjusted content sequence.

12. The apparatus of claim 9, wherein the client device is a first client device, wherein the instructions include instructions to:
    subsequent to a production of the audio stream, receive a request for the audio stream from a second client device; and
    transmit the audio stream to the second client device responsive to the request.

13. The apparatus of claim 9, wherein the scores are determined for sets of the other content items randomly identified based on tags associated with the other content items, wherein the instructions to determine the content sequence for the first content item and the second content item include instructions to:

determine that a first set of other content items in which the first content item is ordered before the second content item has a higher one of the scores than a second set of other content items in which the first content item is ordered after the second content item.

14. A non-transitory computer-readable storage medium comprising processor-executable routines that, when executed by a processor, facilitate a performance of operations for producing an audio stream, the operations comprising:

receiving, from a first client device, input defining a first content item to include in the audio stream, the input indicating one or more tags associated with one or more content types of the first content item;

identifying candidate content items to include in the audio stream by using a genetic algorithm to iterate through combinations of tags representative of the candidate content items, wherein the combinations of tags omits the one or more tags, wherein the candidate content items omits the first content item, wherein using the genetic algorithm to iterate through the combinations of tags includes, for each of the combinations of tags:

randomly selecting the combination of tags, the combination of tags including a purpose tag representing a candidate content item of the candidate content items;

determining, as a count value, a number of content items currently selected for inclusion in the audio stream and which are associated with the purpose tag, wherein the number of content items currently selected for inclusion in the audio stream includes the first content item;

determining, as a degrading factor, a value defining a rate for adjusting a score for the candidate content item based on the count value; and determining the score for the candidate content item based on the count value and the degrading factor;

identifying one of the candidate content items as a second content item based on a determination that the one of the candidate content items has a highest one of the scores;

responsive to identifying the one of the candidate content items as the second content item, retrieving the second content item from a database;

determining, based on the one or more tags and at least one tag associated with one or more content types of the second content item, a content sequence for the first content item and the second content item;

producing the audio stream according to the content sequence;

subsequent to producing the audio stream, receiving a request for the audio stream from a second client device; and transmitting the audio stream to the second client device responsive to the request.

15. The non-transitory computer-readable storage medium of claim 14, wherein the scores are determined for sets of the candidate content items randomly identified based on tags associated with the candidate content items, wherein the operations for determining the content sequence for the first content item and the second content item comprise:

determining that a first set of candidate content items in which the first content item is ordered before the second content item has a higher one of the scores than a second set of candidate content items in which the first content item is ordered after the second content item.

16. The non-transitory computer-readable storage medium of claim 15, wherein an order of content items included in a set of candidate content items is determined based on the tags associated with the content items included in the set of candidate content items.

17. The non-transitory computer-readable storage medium of claim 14, wherein the operations for producing the audio stream according to the content sequence comprise combining the audio stream with a video stream to produce a combined stream, wherein the operations for transmitting the audio stream to the second client device responsive to the request comprise transmitting the combined stream to the second client device responsive to the request.

18. The non-transitory computer-readable storage medium of claim 14, the operations further comprising:

detecting that a third content item is not available for inclusion in the audio stream by querying the database based on at least some of the one or more tags; and responsive to the detecting, transmitting a message to the first client device to request the third content item.

19. The non-transitory computer-readable storage medium of claim 18, the operations further comprising:

receiving the third content item responsive to the message;

adjusting the content sequence based on the third content item to produce an adjusted content sequence; and updating the audio stream to include the third content item according to the adjusted content sequence.

20. The non-transitory computer-readable storage medium of claim 14, wherein a tag of the one or more tags includes metadata defining a name, relation type, weight, and description associated with the first content item, wherein the metadata further defines at least one of a content indicator associated with the first content item, an owner name associated with the first content item, or a source indicator associated with the first content item.

* * * * *